Aug. 28, 1956 M. CAMRAS 2,761,017

PROTECTOR FOR MAGNETIC RECORD

Filed Oct. 16, 1951 2 Sheets-Sheet 1

Inventor
Marvin Camras
by Hill, Sherman, Meroni, Gross & Simpson Attys

Aug. 28, 1956 M. CAMRAS 2,761,017

PROTECTOR FOR MAGNETIC RECORD

Filed Oct. 16, 1951 2 Sheets-Sheet 2

Inventor
Marvin Camras by Hill, Sherman, Meroni, Gross & Simpson Attys

United States Patent Office
2,761,017
Patented Aug. 28, 1956

2,761,017

PROTECTOR FOR MAGNETIC RECORD

Marvin Camras, Chicago, Ill., assignor to Armour Research Foundation of Illinois Institute of Technology, a corporation of Illinois Application October 16, 1951, Serial No. 251,603

20 Claims. (Cl. 179—100.2)

The present invention relates to an improvement in magnetic recording and reproducing assemblies.

The present invention is particularly directed to a magnetic transducing assembly including a system for preventing accidental or unintentional erasure of the intelligence recorded on a magnetic record impulse member.

Conventional magnetic transducing assemblies usually include electrical circuits for providing three functions, the first being the reproduction of the intelligence on the recorded medium, second being an erasing function for removing the intelligence previously recorded on the member prior to a new recording operation, and the third being the recording of intelligence on a previously unrecorded or on an erased record member. Ordinarily, only two electromagnetic heads, and in some cases, only a single head are used to achieve these three functions. Thus, the reproducing head usually consists of a ferromagnetic core structure, including a non-magnetic gap over which the record member is drawn during the recording operation. The ferromagnetic core structure includes one or more coils which transform the magnetic variations across the non-magnetic reproducing gap created by the passage of the recorded record member thereover into electrical variations which can be subsequently amplified and reproduced in a conventional audio amplifier.

The erasing head also includes a ferromagnetic structure having a coil associated therewith for creating a relatively high frequency magnetic field across the erasing gap, to thereby eliminate any recording previously made on the record member as the member is drawn over the erasing gap. Alternatively, erasure may be made by a magnetic field derived from an erase coil energized by direct current.

The recording portion of the assembly normally utilizes the same ferromagnetic circuit as the reproducing head with the addition of a source of relatively high frequency current which is superimposed on the electrical signal fed to the recording coil during the recording operation. It is to be understood that the magnetic transducing assembly is provided with a switch to selectively change from a recording to a listening operation, the erase head and the high frequency bias circuit being operable during the recording operation, and being rendered inoperative during the listening operation.

With a system of the type described above, it is quite possible that an inexperienced or careless operator will occasionally make accidental erasures on a magnetic record, by having the assembly in "record" position where the intention was merely the reproduction of the intelligence upon the record. This accidental erasure becomes a very definite inconvenience where the record member contains a professionally recorded program which may have been quite expensive.

An object of the present invention is to provide a magnetic transducing system in which accidental or unintentional erasing of a pre-recorded magnetic record member is effectively prevented.

Still another object of the present invention is to provide a magnetic recording and reproducing device in which reels of different configuration cooperate differently with the transducing apparatus so that one type of reel is usable for recording and reproducing purposes, whereas another type of reel can be used only for a reproducing operation.

Another object of the present invention is to provide an improved record protector system for rendering the erasing and recording portions of a transducing assembly inoperative where a so-called permanent record is placed upon the machine.

Another object of the present invention is to provide an improved record protector system which permits the use of conventional type spools for reproducing purposes only and recording only with spools of a different configuration.

The novel features which I believe to be characteristic of my invention are set forth with particularity in the appended claims. My invention itself, however, both as to its organization, and manner of construction, together with further objects and advantages thereof, may best be understood by reference to the accompanying drawings, in which:

As shown on the drawings.

Figures 1, 2, 3, 4, 5, 6:
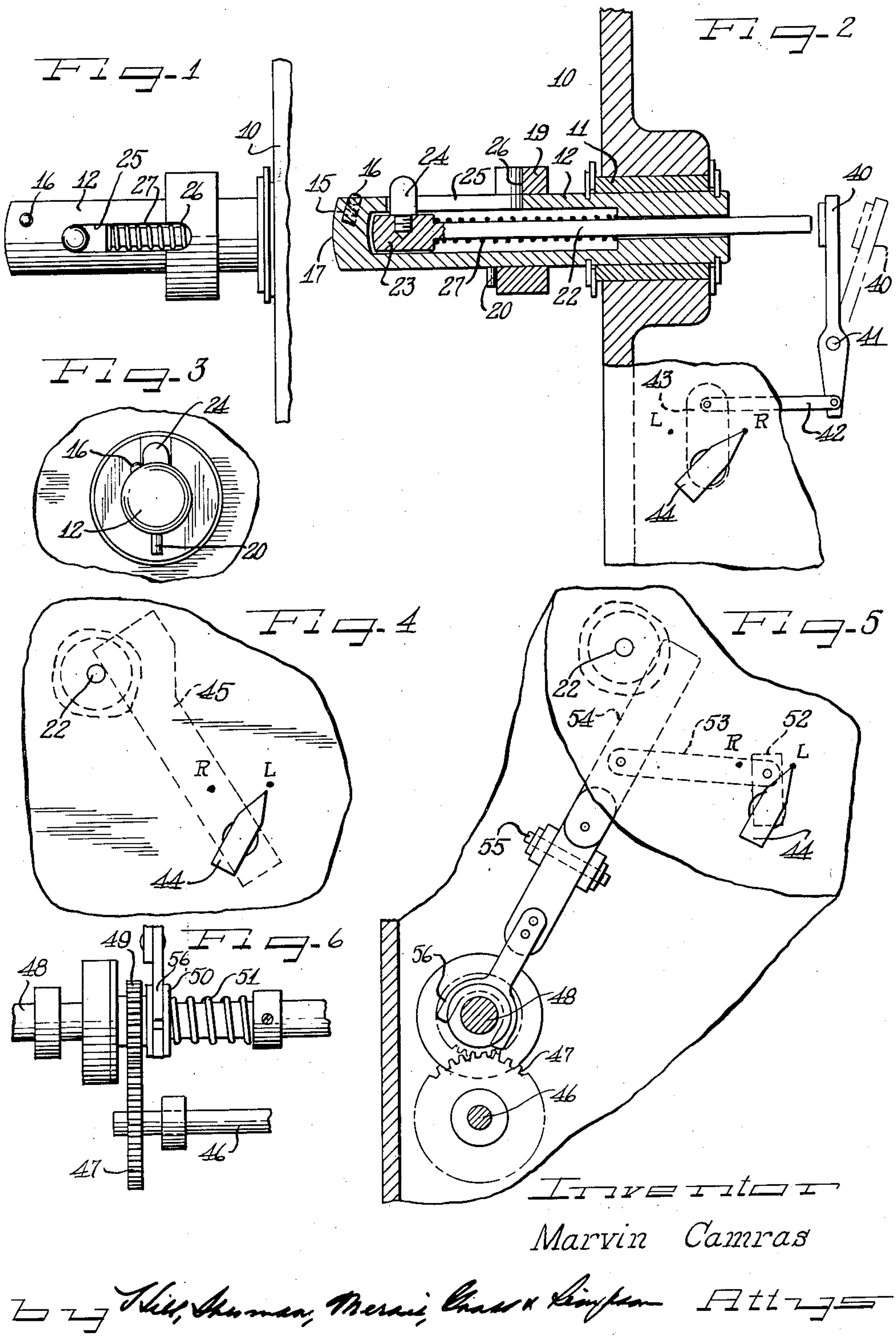
Figure 1 is a plan view of a spindle assembly used in the present invention.
Figure 2 is a view with parts in elevation of the spindle assembly shown in Figure 1.
Figure 3 is a side elevational view of the spindle assembly.
Figure 4 is a fragmentary view, with parts in elevation, illustrating another mechanical means which cooperates with the spindle in preventing accidental erasure.
Figure 5 is a fragmentary view of another mechanical system, employing a clutch mechanism for preventing accidental erasure of a recording.
Figure 6 is a fragmentary view, with parts in elevation, of the clutch mechanism illustrated in Figure 5.

Figures 1 through 3 illustrate a spindle assembly for carrying a reel having a magnetic impulse record member wound therearound, and having a mechanism therein which cooperates with either mechanical or electrical systems for the prevention of recording and erasure on a permanent type magnetic record member. By "permanent type magnetic record," I mean a magnetic impulse record member which is to be used for replay purposes only and on which accidental erasure is to be prevented.

The assembly shown in Figures 1–3 includes a main housing 10 which carries a sleeve type bearing 11 through which a spindle arm 12 projects for receiving a permanent or non-permanent type magnetic recording. I prefer to employ the record protector mechanism on the supply spindle, although it will be appreciated that the invention is equally applicable to the take-up spindle, or if desired, both the take-up spindle and the supply spindle can be provided with the protective mechanism.

The spindle arm 12 is provided with an angularly disposed recess 15 which carries a ball detent 16 urged outwardly by means of a coiled spring 17 bottomed in the recess 15. The spring pressed ball detent 16 is arranged to engage one flange of a reel when the reel is received on the spindle arm to prevent the reel from sliding off the spindle arm under normal operating conditions.

Intermediate the ends of the spindle arm 12 is a collar 19 which is arranged to abut the opposite flange of a reel placed upon the spindle arm, so that the reel is held firmly in position between the ball detent 16 and the collar 19. The spindle arm 12 also carries a driving pin 20 for engaging the reel in driving connection, as will hereinafter be explained.

The actuating mechanism for rendering the recording and erasing circuits of the magnetic transducer assembly inoperative when a permanent type record is placed upon the spindle arm 12 includes a rod or control member 22 carried within an axial bore of the spindle arm 12 and having an enlarged end portion 23 receiving an operating button or reel-sensing means 24 in threaded engagement. The button 24 is free to slide in a slot 25 provided in the spindle arm 12, the movement of the operating button 24 being limited at one end by a recess 26 provided in the collar 19. Axial movement of the rod 22 is restrained by the coiled spring 27, so that the operating button 24 is constantly urged toward the free end of the spindle arm 12, a position shown in Figure 2.

Figure 7:
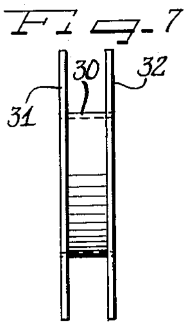
Figure 7 is a side elevational view of a reel of the type employed with the spindle assembly of the previous drawing.
Figure 8:
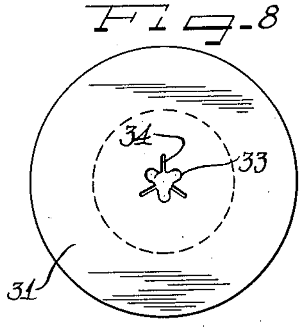
Figure 8 is a side elevational view of a reel which can be used in the spindle assembly for both recording and reproducing operation.
Figure 9:
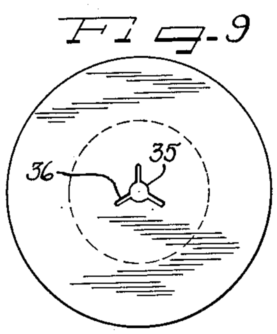
Figure 9 is a side elevational view of a reel assembly for a "permanent" record, on which erasure is to be prevented.

The spindle assembly illustrated in Figures 1–3 is arranged to cooperate differently with two different types of reels, the reels being illustrated more particularly in Figures 8 and 9. Both reels indicated in Figures 8 and 9 include a reel traverse 30 and opposed end flanges 31 and 32 (Figure 7). In Figure 8, there is illustrated an end flange construction 31 for a reel which carries a non-permanent type record, i. e., one upon which both recording and reproducing are to be effected. To prevent actuation of the deenergizing circuits, the reel of Figure 8 is provided with circumferentially spaced circular recesses 33 of a size sufficient to slip over the actuating button 24 without causing axial movement of the rod 22. To achieve a driving connection between the reel and the spindle arm, the reel of Figure 8 is provided with radially spaced slots 34 which are arranged to receive the drive pin 20 associated with the spindle arm 12. Thus, if a reel of the configuration of that shown in Figure 8 is placed over the spindle arm of Figure 2, the reel is free to slide over the operating button 24 and to engage the drive pin 20 within one of the slots 34.

The reel assembly of Figure 9 is a conventional reel assembly for motion picture film, and for the purposes of this invention is used for containing a permanent type record. Thus, the reel includes a center bore 35 of sufficient diameter to be received on the spindle arm 12 and also contains a radially spaced slot 36 for engaging the driving pin 20. However, when a reel of the configuration shown in Figure 9 is placed on the spindle arm 12, the reel end flange contacts the operating button 24 and forces the actuating rod 22 to the right as viewed in Figure 2. Thus, movement of the rod 22 depends upon the configuration of the reel which is placed on the spindle arm.

Figure 10:
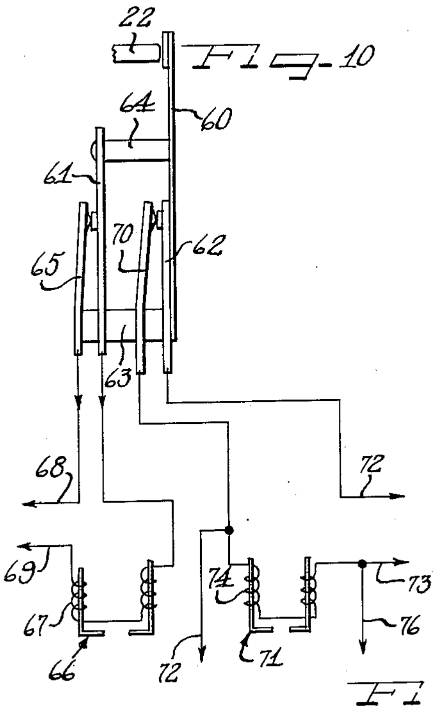
Figure 10 is a schematic diagram of an electrical system which can be employed in cooperation with the spindle to prevent accidental recording.
Figure 11:
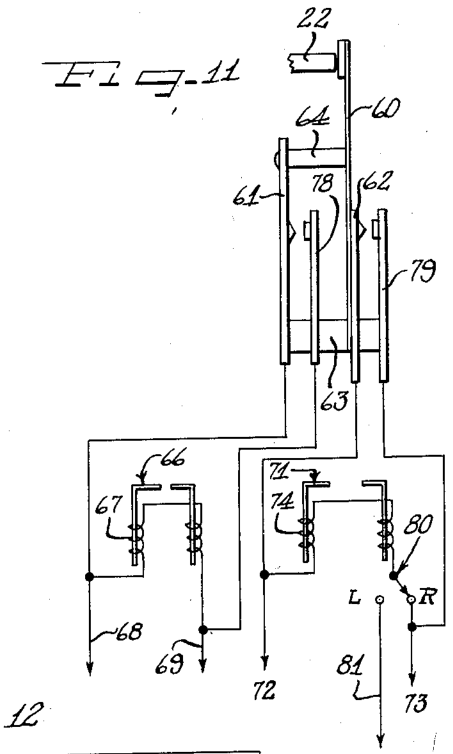
Figure 11 is a schematic diagram of a slightly modified electrical system which can also be employed for the same purpose.
Figure 12:
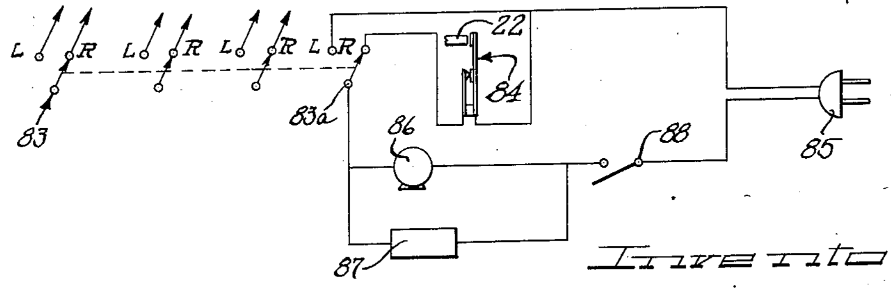
Figure 12 is a still further modified electrical system which can be employed for the purposes of this invention.

Movement of the rod 22 can be employed to cooperate with the remainder of the assembly in numerous ways to prevent the erasing and recording circuit from being operative if a permanent type record is placed on the spindle arm 12. In Figures 2, 4, 5 and 6, I have illustrated mechanical systems which are actuated by movement of the arm 22 to prevent erasing and recording. Figures 10, 11 and 12 illustrate electrical systems which achieve the same results.

In the mechanical system of Figure 2, the end of the rod 22 is arranged to engage an end of the lever arm or linkage member 40, the arm 40 being pivoted around a pin 41. A pivotal link 42 connects the opposite end of the lever arm 40 to an arm 43 carried by a "listen-record" selector switch 44. It will be appreciated that the listen-record switch controls the appropriate circuit for selectively placing the assembly in a listening or recording condition, that is, in the "listen" position, the pick-up coil on the reproducing head is connected to the input circuit of the audio amplifier, while the high frequency circuits for erasing and bias are deenergized. Similarly, when the switch is in record position, the output of the audio amplifier which amplifies signals from the microphone is connected to the coil on the recording head, and simultaneously the high frequency current is superimposed on the audio signals being received from the output of the amplifier. At the same time, the erase coil is energized by a high frequency current.

As will be evident from Figure 2, if a "permanent type" reel is placed upon the spindle arm 12, resulting in the axial movement of the rod 22 to the right as seen in Figure 2, the end of the rod 22 will engage the end of the lever arm 40 and by virtue of the linkages afforded by link arm 42 and the arm 43, the selector switch 44 will be shifted from the "record" position illustrated in Figure 2 to the "listen" position indicated by the letter L. Thus, the assembly will be rendered inoperative for anything but reproducing of the intelligence on the record. In the system of Figure 2, it will be observed that once the switch 44 is in listening position, an attempt to move the switch 44 into record position results in pivoting the lever arm 40 in the opposite direction, and if sufficient force is applied to the switch 44, the lever arm 40 will act to push the rod 22 to the left, so that the end flange of the reel, being in abutting engagement with the button 24, will be forced off the spindle arm 12 against the pressure of the ball detent 16.

In the modified form of the invention shown in Figure 4, the selector switch 44 carries an arm 45 which serves as a physical abutment for the end of the rod 22. In the "listen position" illustrated in Figure 4, the end of the rod 22 does not engage the arm 45, so that the assembly is free to reproduce any intelligence on the record member. When, however, the selector switch 44 is in record position and a "permanent type" reel is placed on the spindle arm 12, the arm 45 is in position to block axial movement of the rod 22, so that the reel cannot be fixed in position on the spindle arm 12 between the ball detent 16 and the collar 19. When a permanent type reel is already on the spindle the selector switch 44 cannot be moved into record position.

In the modified mechanical system of Figures 5 and 6, the deactivation of the assembly is achieved through the disengagement of a clutch member associated with the driving elements which move the record member. As shown in these figures, a drive shaft 46 having a gear 47 fixed thereto drives an auxiliary shaft 48, through a driving connection with a gear 49 on that shaft. A clutch member 50 is interposed on the auxiliary shaft 48, and the clutch 50 is normally urged into its engaged position by means of a spring 51. Referring to Figure 5, it will be seen that the selector switch 44 carries an arm 52, the latter being connected through a pivotal link 53 to a clutch disengaging arm 54. The arm 54 is arranged for pivotal movement about a stationary pivot pin 55 and has a bifurcated portion 56 in engagement with the clutch member 50. In the position of the switch 44 illustrated in Figure 5, the end of the rod 22 does not engage the arm 54, so that the spring 51 keeps the clutch 50 in engagement and permits both the take-up reel and the supply reel to be rotated for a listening operation. When, however, the selector switch 44 is in "record" position and a reel of the type shown in Figure 9 is placed on the spindle arm 12, the resultant movement of the rod 22 contacts the clutch disengaging arm 54, causing the arm 54 to be pivoted about the pivot pin 55. As this occurs, the bifurcated portion 56 dismember due to the presence of a permanent type recording in association with said assembly.

3. In a magnetic transducer assembly, a selector switch member constructed and disposed for manual actuation and movable to a record position, said selector switch member having means connected therewith and movable along a given path as said selector switch member is moved to record position, and a control member operatively associated with said connected means and movable between a first position in the path of movement of said connected means and a second position out of said path, said control member in its first position being operative to physically block movement of said connected means along said path to thereby block movement of said selector switch member to record position, and said control member in its second position accommodating movement of said selector switch member to record position.

4. A reeling system comprising a spindle for receiving a reel, a control member movably mounted adjacent said spindle and having a reel-engaging means for engaging a predetermined type reel as the same is placed on said spindle, said control member being movable from a first position to a second position by movement of a reel of said predetermined type into operative position on said spindle, a selector switch member constructed and disposed for manual actuation and movable between a first position and a second position, a linkage member operatively connected to said selector switch and movable between a first and a second position by movement of said selector switch member between its first and second positions, said linkage member when in said first position opposing movement of said control member from its first to its second position and thereby opposing placing of said predetermined type reel on said spindle when said selector switch member is in its first position.

5. A reeling system comprising a spindle, a control member movably mounted adjacent said spindle and having a reel-engaging means operatively connected therewith, a reel for fitting on said spindle and having an end flange of construction to engage said control member reel-engaging means to move said control member from a first position to a second position as said reel is moved into operative position on said spindle, a selector switch member constructed and disposed for manual actuation and movable between a first position and a second position, and a linkage member operatively connected to said selector switch member for movement along a path intersecting the second position of said control member as said selector switch member is moved from its second to its first position, movement of said selector switch member from its second to its first position when said reel is in operative position on said spindle thereby causing said linkage member to act against said control member.

6. A reeling system comprising a spindle for receiving a reel, a control member movably mounted adjacent said spindle and having a reel-engaging means for engaging a predetermined type reel as the same is placed on said spindle, said control member being movable from a first position to a second position by movement of a reel of said predetermined type into operative position on said spindle, a selector switch member constructed and disposed for manual actuation and movable between a first position and a second position, a linkage member operatively connected to said selector switch member and to said control member, said linkage member being actuated by movement of said control member from its first to its second position to move said selector switch member from its first position to its second position, said selector switch member thereby being automatically moved from its first position to its second position by placing a reel of said predetermined type on said spindle.

7. A reeling system comprising a spindle for receiving a reel, a control member movably mounted adjacent said spindle and having a reel-engaging means for engaging a reel of a predetermined type as the same is placed on said spindle, said control member being movable from a first position to a second position by movement of a reel of said predetermined type into operative position on said spindle, a selector switch member constructed and disposed for manual actuation and movable between a first position and a second position, and a linkage member operatively connected to said selector switch member for movement into a position intersecting the path of movement of said control member from its first to its second position by movement of said selector switch member from its second to its first position, said linkage member thereby acting against said control member when a reel of said predetermined type is placed on said spindle with said selector switch member in its first position.

8. A reeling system comprising a spindle for receiving a reel, a control member movably mounted adjacent said spindle and having a reel-engaging means for engaging a predetermined type reel as the same is placed on said spindle, said control member being movable from a first position to a second position by movement of a reel of said predetermined type into operative position on said spindle, a selector switch member constructed and disposed for manual actuation and movable between a first position and a second position, and a linkage member operatively connected to said selector switch member and movable along a path transverse to the path of movement of said control member and intersecting the second position of said control member by movement of said selector switch member from its second to its first position, said control member in its second position being operative to block movement of said linkage member to prevent manual actuation of said selector switch member from its second to its first position.

9. A reeling system comprising a spindle for receiving a reel, a control member movably mounted adjacent said spindle and having a reel-engaging means for engaging a predetermined type reel as the same is placed on said spindle, said control member being movable from a first position to a second position by movement of a reel of said predetermined type into operative position on said spindle, a selector switch member constructed and disposed for manual actuation and movable between a first position and a second position, a linkage member operatively connected to said selector switch member and movable into a blocking position intersecting the path of movement of said control member from its first position to its second position by movement of said selector switch member from its second position to its first position, and means constraining said linkage member against substantial movement in the direction of movement of said control member with said selector switch member in its first position, said linkage member in its blocking position thereby being operative to prevent movement of said control member to its second position and thus preventing placing of a reel of said predetermined type on said spindle with said selector switch member in its first position.

10. In a magnetic recording and reproducing assembly, a spindle, a control member movably mounted adjacent said spindle and having a reel-engaging means operatively connected therewith, a reel fitting onto said spindle and having an end flange engaging said control member reel-engaging means for moving said control member from a first position to a second position as said reel is moved into operative position on said spindle, a selector switch member constructed and disposed for manual actuation and movable between a first position and a second position, and a linkage member operatively connected to said selector switch member for movement between a first and a second position by movement of said selector switch member between its first and its second position, said linkage member also being movable from its first to its second position by movement of said control member engages the clutch on the auxiliary shaft 48 and prevents driving power from being supplied to the take-up reel and the supply reel. If a permanent type reel is already on the spindle arm 12, the position of the rod 22 blocks the switch 44 from moving into record position.

The systems of Figures 10 to 12 employ electrical control systems for deenergizing the erase and recording circuits, in place of the mechanical systems previously described. In the system of Figure 10, the end of the rod 22 is arranged to contact a switching arm 60 carrying two resilient contact arms 61 and 62 insulated from each other by an insulating support member 63 and an insulating spacer arm 64. Contact arm 61 is normally in engagement with a resilient contact arm 65, the arms 61 and 65 thereby providing a normally closed switch for the electrical circuit of an erase head diagrammatically illustrated at numeral 66. An erase coil 67 wound about the erase head 66 is energized from a pair of leads 68 and 69 from an oscillator circuit when the switch provided by the contact arms 61 and 65 is closed.

Similarly, the contact arm 62 coacts with a resilient contact arm 70 to control the input to a recording and reproducing head 71. A pair of leads 72 and 73 feed the output of the audio amplifier and the source of bias current into the coil 74 associated with the recording and reproducing head 71, and a pair of leads 75 and 76 are provided to feed the output of the coil 74, when the head is in a reproducing condition, to the reproducing circuits.

Thus, when the rod 22 engages the arm 60, the circuits for erasing and recording are broken, while the reproducing head is still operative.

In the assembly shown in Figure 11, the arangement is similar except that the switch means are arranged to short circuit the erase head and the reproducing head upon movement of the rod 22. A normally open switch across the erase head 66 is provided by a pair of contact arms 61 and 78, and a similar normally open switch across the head 71 is provided by the contact arms 62 and 79. To permit the head 71 to be operative as a reproducing head, a listen-record switch 80 is provided in series with the coil 74. When the switch 80 is in "record" position, and the rod 22 engages the arm 60, both the erase head 66 and the head 71 are shorted out. However, when the switch 80 is in "listen" position, the head 71 is operative as a reproducing head even though the other switches are closed by movement of the rod 22, the outpost of the coils 74 being fed to the amplifier circuits by the leads 72 and 81.

In the form of the invention illustrated in Figure 12, a ganged listen-record switch 83 has a plurality of switch contacts in the various head circuits for changing from a reproducing to a recording condition. One of these switches, 83*a*, is in the main energizing line of the magnetic recorder. A plug 85 is provided for energizing a drive motor 86 and amplifier and oscillator circuits 87 from a source of alternating current. A main on-off switch 88 is also included in series with one side of the line to enable complete deenergization of all the circuits.

A switch 84, cooperating with the rod 22, is also included to permit complete deenergization of the circuits by movement of the rod 22 in response to the type of reel which is placed on the spindle arm. Thus, when the main on-off switch 88 is in closed position, and the record-listen switch 83 is in "record" position, the energization of the complete assembly is at the control of the switch 84. When the switch 83 is in "listen" position, the switch 84 is removed from the circuit, and the motor, amplifier, and oscillator circuits are continuously energized as long as the main on-off switch 88 is closed.

The above description indicates numerous mechanical and electrical means for rendering a magnetic transducing assembly inoperative for erasing and recording when a "permanent" type reel is attempted to be placed on the reel receiving spindle. Any of these systems provide a fool-proof means for preventing erasure and recording on a record which is to be used for reproducing purposes only, provided the record is wound on a reel having the proper configuration. It will be appreciated, however, that even such "permanent" records can be erased and re-recorded, if desired, by winding the record medium on a reel which does not energize the deactivating circuit, as for example, the type shown in Figure 8.

From the foregoing it will be apparent that the invention provides a means for conveniently preventing erasing and recording on a record to be used for reproducing purposes, only while still permitting recording, erasing and reproduction of records wound on different type of reels. The elements of the system, particularly the spindle arm are inexpensively constructed, and mechanically simple.

While the foregoing description has dealt primarily with systems in which the abutment means cooperate with reels of different configurations, it will be appreciated that the invention is equally applicable to assemblies in which the reels are included in magazines, and the magazines are provided with surfaces which engage or do not engage the abutment means, depending on the type of record in the magazine.

It will also be apparent that the system is also adapted for use on magnetic recording assemblies having no erase head, and may also be modified to render the erase head only inoperative, instead of both of the erase head and the recording head.

It will be appreciated that various modifications and variations may be effected without departing from the scope of the novel concepts of the present invention.

I claim as my invention:

1. In a magnetic recording and reproducing assembly, a selector switch member constructed and disposed for manual actuation and movable between a record position and a play-back position to selectively place said assembly in condition for recording and play-back, a linkage member operatively connected to said selector switch member for moving said selector switch member from record to play-back position, sensing means actuated by placing a permanent type recording in operative association with said assembly, and control means operatively connected with said sensing means for actuation by actuation of said sensing means and operative to actuate said linkage member and thereby move said selector switch member from record position to play-back position when the selector switch member is initially in record position, the selector switch member thereby being automatically moved from record to play-back position when a permanent type magnetic recording is placed in operative association with said assembly.

2. In a magnetic recording and reproducing assembly, a selector switch member constructed and disposed for manual actuation and movable between a record position and a play-back position to selectively place said assembly in condition for recording and play-back, a linkage member operatively connected to said selector switch member for moving said selector switch member from record to play-back position, sensing means actuated by placing a permanent type recording in operative association with said assembly, and control means operatively connected with said sensing means for actuation by actuation of said sensing means and operative to actuate said linkage member and thereby move said selector switch member from record position to play-back position when the selector switch member is initially in record position, the selector switch member thereby being automatically moved from record to play-back position when a permanent type magnetic recording is placed in operative association with said assembly, and said linkage member being operatively connected to said selector switch member and to said control member to oppose movement of said selector switch member from play-back to record position during actuation of said control from its first to its second position to move said selector switch member from its first to its second position when said reel is placed on said spindle, and said control member in its second position opposing movement of said linkage member from its second to its first position to thereby oppose movement of said selector switch member from its second to its first position with said reel on said spindle.

11. A reeling system comprising a spindle for receiving a reel, a control member movably mounted adjacent said spindle and having a reel-engaging means for engaging a predetermined type reel as the same is placed on said spindle, said control member being movable from a first position to a second position by movement of a reel of said predetermined type into operative position on said spindle, spring urged detent means on said spindle for retaining a reel of said permanent type in operative relation to said spindle, a selector switch member constructed and disposed for manual actuation and movable between a first position and a second position, and a linkage member operatively connected to said selector switch member for movement between a first and a second position by movement of said selector switch member between its first and its second position, said linkage member being operative to move said control member from its second to its first position by movement of said linkage member from its second to its first position, and said control member being operative to force a reel of said predetermined type off said spindle against the action of said detent means by movement between its second and its first position, said selector switch member thus being operative to eject a predetermined type reel from said spindle if the selector switch member is forced from its second position to its first position with a reel of said predetermined type on said spindle.

12. A reeling system comprising a spindle for receiving a reel, a control member movably mounted adjacent said spindle and having a reel-engaging means for engaging a predetermined type reel as the same is placed on said spindle, said control member being movable from a first position to a second position by movement of a reel of said predetermined type into operative position on said spindle, a selector switch member constructed and disposed for manual actuation and movable between a first position and a second position, a linkage member operatively connected to said selector switch member for movement between a first and a second position by movement of said selector switch member between its first and its second position, said linkage member being movable from its first position to a third position by movement of said actuating member from its first to its second position, driving means for said reeling system including a clutch controlling activation of said reeling system by said driving means, and clutch control means operatively connected to said linkage member and to said clutch and actuated by movement of said linkage member from its first to its third position to disengage said clutch to deactivate said driving means, said actuating member thereby deactivating said reeling system when a reel of said predetermined type is placed on said spindle with said selector switch member in its first position.

13. A reeling system comprising a spindle, a control member movably mounted adjacent said spindle and having a reel-engaging means operatively connected therewith, a reel for fitting on said spindle and having an end flange of construction to engage said control member reel-engaging means to move said control member from a first position to a second position as said reel is moved into operative position on said spindle, a selector switch member constructed and disposed for manual actuation and movable between a first position and a second position, a linkage member operatively connected to said selector switch member for movement in a direction transverse to the path of movement of said control member between a first and a second position by movement of said selector switch member between its first and its second position, said linkage member in its first position being disposed to intersect the path of movement of said control member for movement from its first position to a third position by movement of said control member from its first to its second position, and activating means for said reeling system operatively associated with said linkage member for deactivation by said linkage member as said linkage member moves from its first to its third position, said reeling system activating means thereby being deactivated when a reel of said predetermined type is placed on said spindle with said selector switch member in its first position.

14. In a magnetic recording and reproducing assembly, a control member actuated by placing a permanent type recording in operative association with said assembly to move from a first position to a second position, a selector switch member constructed and disposed for manual actuation and movable between a record position and a listen position to selectively place said assembly for recording and reproduction, a linkage member operatively connected to said selector switch member for movement between a first and a second position by movement of said selector switch between its record and listen positions, said linkage member in its first position being disposed in the path of movement of said control member from its first to its second position for movement from its first position to a third position by movement of said control member from its first to its second position, clutch control means for said assembly including a pivotally mounted clutch control member pivotal from a first position to a second position to disengage said clutch control means, said linkage member being operatively connected to said clutch control member to pivot said clutch control member between its first and second positions by movement of said linkage member between its first and its third position, and said linkage member being pivotal relative to said clutch control member in a transverse direction to accommodate movement of said linkage member from its first to its second position, said linkage member being displaced from the path of movement of said control member in its second position.

15. In a magnetic recording and reproducing assembly, a spindle having an interior bore and an axially extending slot communicating with said bore and opening at the periphery of said spindle and extending axially therealong, a reel-engaging member extending generally radially through said slot and projecting above the periphery of said spindle, a control member axially reciprocally mounted in said spindle interior bore and operatively connected with said reel-engaging member for movement from a first position to a second position by engagement of a permanent type reel with said reel-engaging member as the permanent type reel is applied to said spindle, a selector switch member constructed and disposed for manual actuation and movable between a record position and a listen position to selectively place said assembly in condition for recording and reproduction, and a linkage member operatively connected to said selector switch member and movable into a position in the path of movement of said control member between its first and second position by movement of said selector switch member from its listen position to its record position, said linkage member thereby engaging said control member when a permanent type reel is placed on said spindle with said selector switch member in record position.

16. In a magnetic recording and reproducing assembly, a selector switch member constructed and disposed for manual actuation and movable to a listen position to place said assembly in condition for play-back, a linkage member operatively connected to said selector switch member for moving said selector switch member to listen position, control means operatively connected to said linkage member and movable to an actuated position to actuate said linkage member to move said selector switch member to listen position, and means operatively connected with said control means and actuated by placing a permanent type recording in operative relation to said assembly to move said control means to its actuated position, said selector switch member thereby being automatically moved to listen position when a permanent type recording is to be played by said assembly.

17. In a magnetic recording and reproducing assembly, a selector switch member constructed and disposed for manual actuation and movable to a record position to place said assembly in condition for recording, a linkage member operatively connected to said selector switch member and movable with said selector switch member as the same is moved to record position, control means operatively connected to said linkage member and movable to an actuated position intersecting the path of movement of said linkage member, said control means in actuated position being operable to oppose movement of said linkage member to thereby oppose movement of said selector switch member to record position, and means operatively connected with said control means and actuated by placing a permanent type recording in operative relation to said assembly to move said control means to its actuated position, movement of said selector switch member to record position thus being opposed when a permanent type recording is associated with said assembly.

18. In a magnetic transducer assembly, a selector switch member constructed and disposed for manual actuation and movable to a record position, said selector switch member having means connected therewith and movable along a given path as said selector switch member is moved to record position, a control member operatively associated with said connected means and movable between a first position in the path of movement of said connected means and a second position out of said path, said control member in its first position being operative to physically block movement of said connected means along said path to thereby block movement of said selector switch member to record position, and said control member in its second position accommodating movement of said selector switch member to record position, abutment means operatively connected to said control member and operative to move said control member to one of its positions, and spring means operatively connected to said control member and operative to urge said control member toward the other of its positions.

19. Recording and reproducing assembly comprising means for selectively mounting a generally available conventional reel and a special type reel, selector means constructed and disposed for actuation and movable to a record position to place said assembly in condition for recording, a linkage member operatively associated with said selector means and movable therewith as the same is moved to record position, control means being associated with said reel mounting means and operatively connected to said linkage member, means whereby the control means is operative with a conventional reel and not with a special reel, and means whereby said control means prevents movement of the linkage member and of the selector means to record position when actuated, whereby said generally available conventional reel having a permanent type record thereon will not be erased when placed on the mounting means and said special reel having a record thereon may be erased for re-recording on the record medium when placed on the mounting means.

20. In a recording and reproducing system, an assembly for recording and reproducing records and adapted to receive reels carrying a recording medium, selector means constructed and disposed for actuation and movable to a record position to place said assembly in condition for recording, a linkage member operatively associated with said selector means and movable therewith as the same is moved to record position, control means operatively associated with said linkage member, said control means positioned to be operative with a conventional reel and not with a special reel in operating position on said assembly, and means whereby said control means prevents movement of the linkage member and of the selector means to record position when in operative locked position, and means whereby the control means is responsive to a special key reel having key means instead of a conventional reel having flush solid portion to unlock the control means whereby the assembly is locked in the presence of an ordinary reel in operating position on said assembly to prevent harming a record thereon and can be unlocked only by the special key reel in operating position on said assembly.

References Cited in the file of this patent

UNITED STATES PATENTS

| | | |
|---|---|---|
| 2,080,026 | Albrecht | May 11, 1937 |
| 2,466,514 | Vogtborg | Apr. 5, 1949 |
| 2,515,190 | Camras | July 18, 1950 |
| 2,538,892 | Begun | Jan. 23, 1951 |
| 2,594,630 | Fling | Apr. 29, 1952 |
| 2,612,565 | Heller | Sept. 30, 1952 |
| 2,622,812 | Brastod | Dec. 22, 1952 |
| 2,713,462 | Camras | July 19, 1955 |